United States Patent [19]
Pyreddy et al.

[11] Patent Number: 5,950,196
[45] Date of Patent: Sep. 7, 1999

[54] SYSTEMS AND METHODS FOR RETRIEVING TABULAR DATA FROM TEXTUAL SOURCES

[75] Inventors: Pallavi Pyreddy, Chicago, Ill.; W. Bruce Croft, Amherst, Mass.

[73] Assignee: Sovereign Hill Software, Inc., Hadley, Mass.

[21] Appl. No.: 08/901,234

[22] Filed: Jul. 25, 1997

[51] Int. Cl.⁶ .................................................. G06F 17/30
[52] U.S. Cl. ..................... 707/5; 707/4; 707/6; 707/104; 455/4
[58] Field of Search .................................. 707/6, 9, 102, 707/5, 2, 4, 104; 706/45, 47, 60; 345/333, 326; 455/4

[56] References Cited

U.S. PATENT DOCUMENTS

| | | | |
|---|---|---|---|
| 5,265,056 | 11/1993 | Turtle ..................................... | 395/600 |
| 5,418,948 | 5/1995 | Turtle ..................................... | 395/600 |
| 5,488,725 | 1/1996 | Turtle et al. ............................. | 395/600 |
| 5,519,857 | 5/1996 | Kato et al. ............................... | 707/5 |
| 5,523,942 | 6/1996 | Tyler et al. .............................. | 705/4 |
| 5,742,816 | 4/1998 | Barr et al. ............................... | 707/104 |
| 5,754,939 | 5/1998 | Herz et al. ............................... | 455/4 |

OTHER PUBLICATIONS

Callan et al., "The INQUERY Retrieval System," In *Proceedings of the Third International Conference on Database and Expert Systems Applications*, Valencia, Spain, 1992, Springer–Verlag, pp. 78–83.

Callan et al., "Tipster text Phase 2 Activities: The University of Massachusetts at Amherst," Tipster Text Phase II 24–Month Workshop, University of Massachusetts, Amherst, Massachusetts, May 5–8, 1996, 17 pages.

Fujisawa et al., "Segmentation Methods for Character Recognition: From Segmentation to Document Structure Analysis," *Proceedings of the Institute of Electrical and Electronics Engineers*, Vol. 80, No. 7, Jul., 1992, pp. 1079–1092.

Nagy et al., "A Prototype Document Image Analysis System for Technical Journals," *Computer*, Jul., 1992, pp. 10–22.

Ponte et al., "Useg: A Retargetable Word Segmentation Procedure for Information Retrieval," University of Massachusetts Technical Report TR 96–2, presented at *Symposium on Document Analysis and Information Retrieval '96 (SDAIR)*, Las Vegas, Nevada, Apr. 15, 1996, 10 pages.

Pyreddy et al., "TINTIN: A System for Retrieval in Text Tables," presented at *Digital Libraries '97 Conference*, Philadelphia, PA, Jul. 25, 1997, 12 pages.

Rus et al., "Does Navigation Require More Than One Compass?" Presented at *American Association for Artificial Intelligence Fall 1995 Symposium*, Boston, MA, Nov. 11, 1995, pp. 1–7.

Wang et al., "Classification of Newspaper Image Blocks Using Texture Analysis," *Computer Vision, Graphics, and Image Processing* 47, 1989, pp. 327–352.

*Primary Examiner*—Wayne Amsbury
*Assistant Examiner*—Thu-Thao Haven
*Attorney, Agent, or Firm*—Testa, Hurwitz & Thibeault, LLP

[57] ABSTRACT

Tables form an important kind of data element in text retrieval. Often, the gist of an entire news article or other exposition can be concisely captured in tabular form. Information other than the key words in a digital document can be exploited to provide the users with more flexible and powerful query capabilities. More specifically, the structural information in a document is exploited to identify tables and their component fields and let the users query based on these fields. Component fields can include table lines, caption lines, row headings, column headings, or other table components. Empirical results have demonstrated that heuristic method based table extraction and component tagging can be performed effectively and efficiently. Moreover, experiments in retrieval using the system of the present invention strongly indicate that such structural decomposition can facilitate better representation of user's information needs and hence more effective retrieval of tables.

20 Claims, 2 Drawing Sheets

SYSTEMS AND METHODS FOR RETRIEVING TABULAR DATA FROM TEXTUAL SOURCES

FIELD OF THE INVENTION

The present invention relates to retrieving data from textual data sources and, in particular, to identifying tabular data embedded in a text document and facilitating the inclusion of the tabular data in a corpus to be searched.

BACKGROUND OF THE INVENTION

Current information retrieval techniques deal with word-based retrieval mechanisms. This is especially true for textual documents. While word-based retrieval mechanisms perform fairly well for highly-focused searches which query a text document for a limited number of keywords, word-based retrieval may overlook diffuse sources of information embedded in a document, such as tables.

Along with providing a source of information in textual documents which word-based retrieval techniques find difficult to tap, tables embedded in a textual document often contain regularity which may be used to augment the capabilities of word-based retrieval systems. Information retrieval tools which are able to exploit cues given by embedded structure within a document can provide users additional power and flexibility in query specification.

Recent techniques for incorporating cues from structural regularities in a document focus primarily on extracting tables from documents. However, these techniques do not distinguish between various table components and are, therefore, unable to allow structured data queries on fields in the table.

Other similar techniques exist in the automated document structuring art, especially bit-mapped images. However, these techniques are primarily concerned with detecting structure in image documents and using the detected structure for traditional image processing and pattern recognition tasks.

SUMMARY OF THE INVENTION

Users of information retrieval systems can be provided with more flexible and powerful searches when the system is capable of detecting and exploiting structure embedded in textual documents. One important kind of structure embedded in a textual document is a data table. Often, the gist of an entire news article or other kind of text document can be concisely captured in tabular form. Extracting tabular data, decomposing it into its constituent elements such as table entries, captions, column and row headings, and exploiting the information in these data may lead to enhanced accuracy in word-based intelligent information retrieval systems. Such tabular data is generally embedded in the text of a document without Standardized General Markup Language (SGML) markers separating it from the rest of the text.

In one aspect, the present invention relates to a method accepting as input a text document and identifying tables and their component fields embedded in the text document. The method begins by storing in a memory element a character alignment graph which indicates the number of textual characters appearing in a particular location in the textual document for a predetermined number of contiguous lines. A line from the text document is identified as belonging to a table when the number of characters in a particular location falls below a predetermined threshold. All of the lines identified as belonging to a table are extracted into a table, and one or more captions for the extracted table are identified on the basis of structural patterns contained in the extracted table.

In another aspect, the present invention relates to a method for facilitating data retrieval from tables embedded in a text document. The method begins by storing in a memory element a character alignment graph which indicates the number of textual characters appearing in a particular location in the textual document for a predetermined number of contiguous lines. A line from the text document is identified as belonging to a table when the number of characters in a particular location falls below a predetermined threshold. All of the lines identified as belonging to a table are extracted into a table, and one or more captions for the extracted table are identified on the basis of structural patterns contained in the extracted table. Each caption is associated with a caption tag and each table entry is associated with a table entry tag. The tagged, extracted table is field indexed to allow structured database queries to be applied to the table.

In still another aspect, the present invention relates to system for performing queries on tables embedded in textual documents. The system includes a table extractor which accepts as input a text document and processes it to identify at least one table embedded in the text document. The system also includes a component tagger, which accepts as input the tables extracted by the table extractor and separates the table into caption lines and table entry lines. An indexing unit indexes the tagged table so that a structured data query can be applied to the extracted, tagged table.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION OF THE INVENTION

Figure 1:
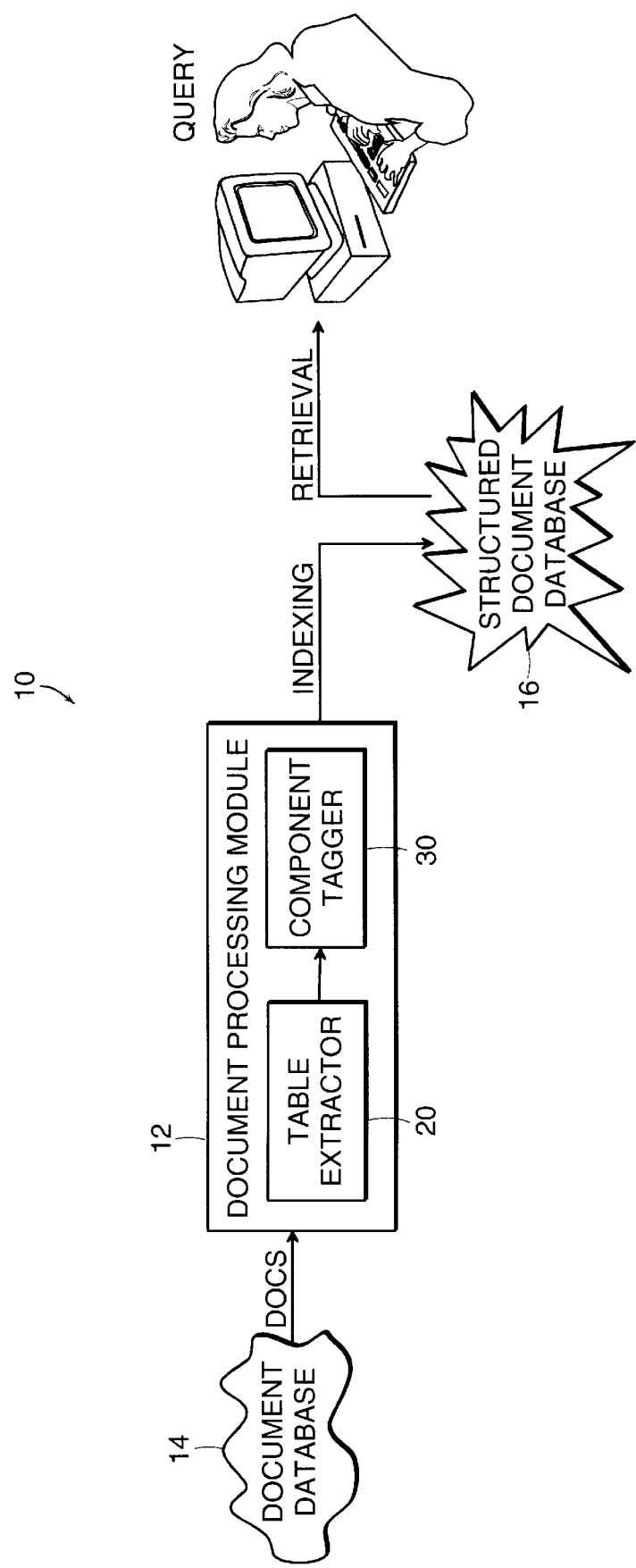
FIG. 1 is a block diagram of the system of the present invention.

Referring now to FIG. 1, a system constructed in accordance with the present invention 10 includes an initial preprocessing module 12 which accepts as input regular text documents from a document database 14, extracts table data from the input text documents, and tags the components of an extracted table for indexing purposes. Components may include captions, headlines, table entries, row headings, column headings, or other table fields. The table output of the preprocessing module 12 is indexed and stored in a structured document database 16. Users may then query the structured document database 16 to retrieve information, including table entries which match the data query submitted by the user.

It is understood that the document database 14, the preprocessing module 12, and the structured database 16 may be hosted on the same machine. In these embodiments, the document database 14 and the structured database 16 may be stored on the same mass storage device or, to improve performance and provide a level of fault-tolerance, each database may be stored on a separate mass storage device. In further of these embodiments, each database may be stored across a plurality of mass storage devices, for example, in systems which include Redundant Array of Individual Disks (RAID) drives. Alternatively, the document database 14, the preprocessing module 12, and the structured database 16 may be stored on separate machines and connected via a network, which may include wireless media. Any network protocol may be used to allow communication between the preprocessing module 12 and the databases for these embodiments, including Ethernet, TCP/IP, LDAP, FTP, or AppleTalk.

As shown in FIG. 1, the preprocessing module 12 includes two submodules: the table extractor 20; and the component tagger 30. The table extractor 20 uses a number of structural heuristics to separate a table from the rest of a textual document received from the document database 14. Once the table is separated from the textual document, the component tagger 30 tags the elements of the table as captions or table entries. The submodules of the preprocessing modules may be provided as a unitary piece of software code or as individual software components which may or may not be interlinked. For example, the table extractor 20 and the component tagger 30 may each be provided as background daemons. In this embodiment, the table extractor 20 operates on an incoming queue of textual documents whenever processing time is available, and outputs a queue of extracted tables. Similarly, for these embodiments, the component tagger 30 in this embodiment operates on an incoming queue of extracted tables, tags the respective fields included in the table, and stores tagged output in the structured database 16. In embodiments requiring speed of processing above all else, the table extractor 20 and component tagger 30 may be provided as special purpose hardware, for example PALs, FPGAs, or ASICs.

Figure 2:
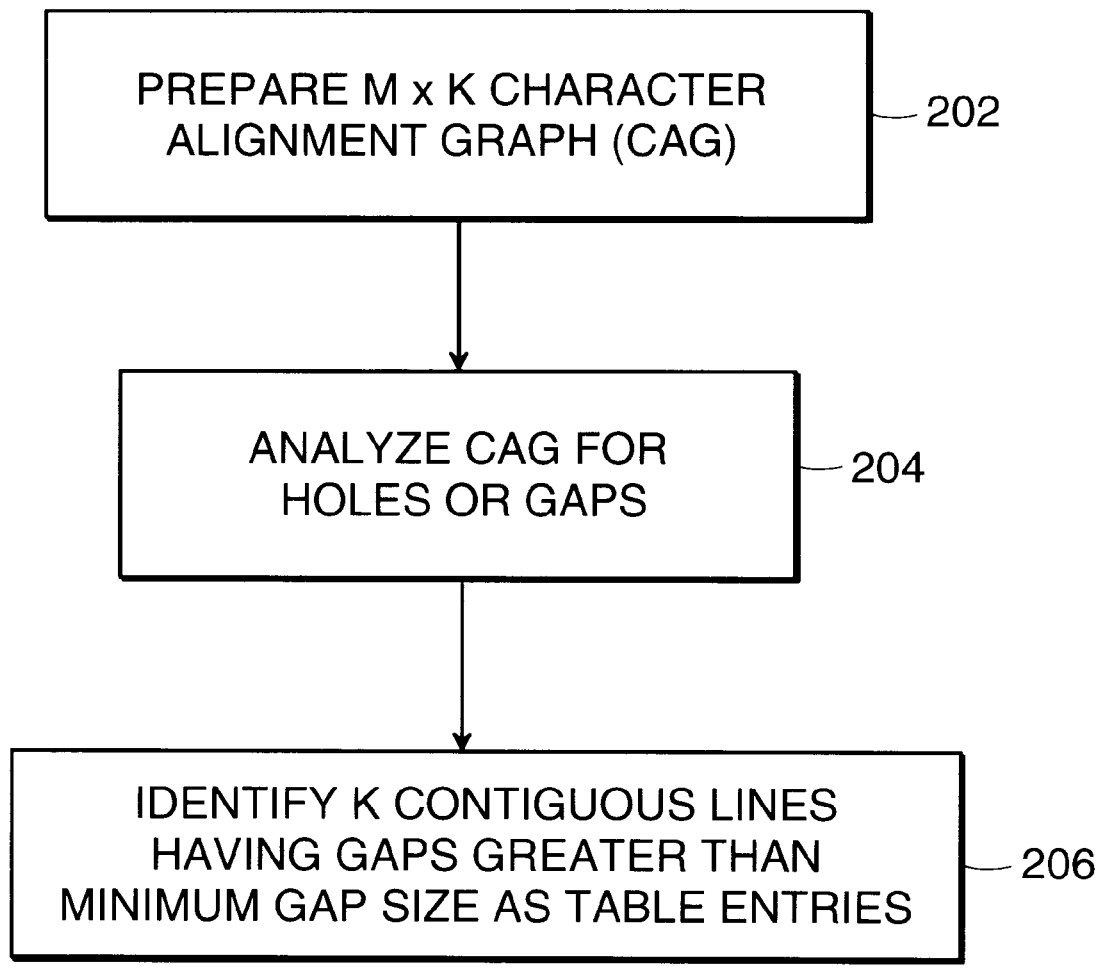
FIG. 2 is a flowchart of the steps taken by the table extractor shown in FIG. 1.

Referring now to FIG. 2, the table extractor 20 processes a text document by examining the textual document for aligned white spaces. Because text contained in textual documents is often "noisy," that is, the lines of text will tend to have intermittent irregularities that can adversely affect a straight-forward algorithm, the table extractor 20 creates a data structure, called the Character Alignment Graph (CAG), which is a histogram plotting the number of text characters appearing in M columns for K continuous lines (step 202). M and K are both tunable parameters that can be used to tune the table extractor 20 for various corpora. The table extractor can be further tuned by defining the universe of characters which "count" as text characters. For example, not counting symbols as text characters may enhance the efficacy of the table extractor 20 for certain corpora, but may prove not as useful for others.

The CAG may be formed using any technique known in the art. For example, an incoming text document may be memory-mapped to a section of memory and the memory locations corresponding to each M×K block of characters may be accessed to form the CAG. Alternatively, the table extractor 20 may maintain a series of temporary data storage locations, each of which having storage for K data elements—one data element for each line of contiguous text to be tracked. After each line of the text document has been processed, each data element will contain an entry for the last K contiguous lines of text and those entries can be processed to generate the ultimate entry for the CAG.

Once the table extractor 20 has generated the CAG, the table extractor 20 may apply a number of heuristic parameters to locate aligned whitespace (step 204). These heuristic parameters include at least: holes (number of blanks between columns); and gaps (number of such contiguous blanks per line). Other parameters may be used to make the extractor flexible and error tolerant.

Within the CAG array, contiguous locations having histogram values below a predetermined threshold indicate the presence of "gaps" (step 206). Such "gaps" are identified as potential column separators and the K lines are identified as potential table entries. Tuning the table extractor 20 to be error tolerant has the beneficial side effect that the table extractor 20 acquires not only table entries but also the potential caption data that surrounds the table lines. In one exemplary embodiment using the Wall Street Journal Database, setting a value of K=3 and setting the minimum gap size (number of contiguous blanks per line) required to indicate a column separation equal to 3 gave good results.

Table 1 below shows an example of a table extracted by the table extractor 20 described above.

TABLE 1

Table extracted from the Wall Street Journal Database
by the table extractor
Such overtime throughout the past year helped Ford boost 1988-model car
and truck production 19% from 19–7 levels, the company said.
Auto Production Fourth-quarter U.S. auto production

|  | 1988 | 1987 | PERCENT CHANGE |
|---|---|---|---|
| GM | 964,653 | 843,908 | +14.3% |
| Ford | 456,954 | 461,150 | −0.9 |
| Chrysler | 294,998 | 283,062 | +4.2 |
| Honda | 86,330 | 80,227 | +7.6 |
| Mazda | 59,464 | 3,800 | — |
| Nissan | 24,604 | 15,289 | +60.9 |
| Toyota | 19,600 | 0 | — |
| Nummi | 16,156 | 38,901 | −58.5 |
| Diamond Star | 2,316 | 0 | — |
| TOTAL | 1,925,075 | 1,726,337 | +11.6% |

First-quarter U.S. auto production

|  | 1989 | 1988 | PERCENT CHANGE |
|---|---|---|---|
| GM | 925,000 | 780,2123 | +18.7% |
| Ford | 475,000 | 479,263 | −0.9 |
| Chrysler | 271,000 | 261,433 | +3.7 |
| Honda | 99,360 | 92,156 | +7.8 |
| Mazda | 61,510 | 16,800 | +266.1 |
| Nissan | 29,522 | 36,324 | −18.7 |
| Toyota | 25,000 | — | — |
| Nummi | 48,000 | 41,479 | +15.7 |
| Diamond Star | 10,000 | — | — |
| TOTAL | 1,945,392 | 1,707,673 | +13.9% |

NOTE:
Estimated from industry and company sources. Vehicles are counted by manufacturer;
the Mazda total includes cars built for Mazda and Ford;
Diamond-Star includes Chrysler and Mitsubishi cars and
Nummi includes Chevrolet and Toyota cars.

Although the column and row headings, and the relevant captions, are extracted by an appropriately tuned table extractor 20 along with the table entries, they are not yet identified as caption data. Caption data and heading data is identified by the component tagger 30.

The component tagger 30 accepts as input an extracted text table of the sort shown in Table 1 above. It is understood that an input table may be extracted, or the data may simply be provided in tabular form. Regardless, these tables will be referred to as "extracted tables." The component tagger applies a number of heuristic techniques to determine if a line contained in an extracted table is caption data or is a table entry. Various techniques must be used to filter, separate, and sometimes undo the interactions between previously applied techniques, due to the numerous formats in which tables occur, and various idiosyncrasies which are present, in textual documents.

The component tagger 30 employs mainly syntactic heuristics, as opposed to semantic heuristics, to identify caption data and table entries. In some embodiments, column headings are also treated as, and tagged as, caption data. The component tagger 30 may use any mechanism to tag lines appearing in the extracted table as either table entries or caption data; in one embodiment, the component tagger 30 tags table lines using <TABLE><LINE FROM EXTRACTED TABLE></TABLE> tags and tags caption using <CAPTION><LINE FROM EXTRACTED TABLE></CAPTION> tags. The component tagger 30 may also tag other table components such as row headings, column headings, or other table components.

Some examples of useful heuristics follow. The following examples may be better understood by referencing Table 2, below. Table 2 depicts an extracted data table in which each of the characters in the extracted table is replaced by a "*" and the blanks appear as extracted from the textual document.

TABLE 2

Extracted table with entries replaced by "*"

```
********** *** ********
************** ********* ** ***************
********** *********
*************              **************
**********      ***       ********       ***
*************   **        ********       **
******          **        ******         **
*** **** *****  **        *******        **
```

Gap Structure Heuristic

This heuristics uses the fact that large, empty spaces, i.e., big gaps, in the middle of an extracted table line indicates that the line is a potential table entry. Large gaps at either the beginning or end of a line are not dispositive because such gaps may only indicate that the table has been centered in the text document from which is was extracted. Referring to Table 2 above, this heuristic would identify the last five lines of the table as possible table entries. Table 2 illustrates the possible limitation of this heuristic, since the column headings appearing in the fourth line of Table 2 would tagged as a table entry, instead of caption data. This example also illustrates that heuristics may need to be applied seriatim, and possibly even in some particular order, to correctly tag all lines.

Alignment Heuristic

This heuristic utilizes the characteristic that if the gaps present in the middle of a line, as well as the characters, of two or more lines are aligned, those lines are likely to be table entries. Again, gaps at the beginning or end of a line may only indicate formatting present in the document from which the table was extracted. Referring to Table 2, this heuristic would indicate that the last three lines of the table are table entries.

Pattern Regularity Heuristic

This heuristic exploits the fact that context information, or regularity, can be used to identify table lines and captions. For example, in the pattern shown in Table 3 below, the third and fifth lines are more likely to be table entries rather than caption data. The "captions" occurring between table lines in such patterns are often table lines that have a different gap structure than the other table lines.

TABLE 3

Table pattern

Caption
Table-Line
Caption
Table-Line
Caption
Table-Line

Table 4, shown below, is an extracted data table exhibiting this pattern.

TABLE 4

An erroneously tagged table (by the earlier heuristics) that is later rectified by the Pattern Regularity Heuristic

| | | | | | |
|---|---|---|---|---|---|
| <CAPTION> | While 52% of consumers surveyed in March by Leo J. Shapiro &\ Associates said Sears was the best place to buy power tools, only 1%\ said it was the best place to buy a woman's dress blouse. </CAPTION> | | | | |
| <CAPTION> | New Sears prices vs. the competition </CAPTION> | | | | |
| <CAPTION> | SEARS | PENNEY | WAL-MART | WARD | TARGET </CAPTION> |
| <TABLE> | Levi 501 jeans men </TABLE> | | | | |
| <TABLE> | $ 19.96 | $ 19.99 | N.A. | N.A. | N.A. </TABLE> |
| <CAPTION> | Vanderbilt one-ounce eau de toilette spray </CAPTION> | | | | |
| <TABLE> | 15.96 | 15.50 | $ 13.84 | $ 15.50 | $ 13.95 </TABLE> |
| <CAPTION> | Fruit of the Loom Men's underwear (three-pack) </CAPTION> | | | | |
| <TABLE> | 3.96 | N.A. | 3.96 | N.A. | 3.99 </TABLE> |
| <CAPTION> | Prestone antifreeze </CAPTION> | | | | |
| <TABLE> | 7.62 | N.A. | 7.47 | 7.99 | 7.99 </TABLE> |
| <CAPTION> | Sealy mattress queen size </CAPTION> | | | | |
| <TABLE> | 549.95 | 557.75 | N.A. | 549.99 | N.A. </TABLE> |
| <CAPTION> | Lego basic building set </CAPTION> | | | | |
| <TABLE> | 9.99 | N.A. | 9.57 | 9.99 | 9.99 </TABLE> |
| <CAPTION> | Etch a Sketch </CAPTION> | | | | |
| <TABLE> | 8.99 | N.A. | 6.97 | 8.99 | 8.99 </TABLE> |

Another example of the way in which the Pattern Regularity Heuristic may be applied is illustrated by Table 5 below. Table 5 depicts a data table having an intermittent caption. Intermittent captions, i.e., caption data which is separated by more than one table entry, should not be corrected by the Pattern Regularity Heuristic, since those lines are more likely to be interspersed caption data and not mistagged table entries.

TABLE 5

An extracted data table with intermittent caption

| | | |
|---|---|---|
| <CAPTION> | Market Share in Europe | </CAPTION> |
| <CAPTION> | (Figures are percentage for 1987) | </CAPTION> |
| <CAPTION> | Central-office telephone-switching lines | </CAPTION> |
| <TABLE> | Alcatel | 40.0% </TABLE> |
| <TABLE> | Plessey/GEC | 16.7 </TABLE> |
| <TABLE> | Ericsson | 13.6 </TABLE> |
| <TABLE> | Siemens | 10.2 </TABLE> |
| <TABLE> | Italtel | 8.4 </TABLE> |
| <TABLE> | Others | 11.1 </TABLE> |
| <TABLE> | TOTAL SHIPMENTS: | 9.6 million lines |
| <CAPTION> | Semiconductors | </CAPTION> |
| <TABLE> | Phillips | 14.6 <TABLE> |
| <TABLE> | SGS-Thomson | 8.6 <TABLE> |
| <TABLE> | Texas Instruments | 7.7 <TABLE> |
| <TABLE> | Motorola | 7.5 <TABLE> |
| <TABLE> | Siemens | 7.5 <TABLE> |

TABLE 6

The second and third lines are tagged captions by the Differential Column Count Heuristic

| | | | | |
|---|---|---|---|---|
| </CAPTION> | The percentage change is since year-end. | | | </CAPTION> |
| </CAPTION> | | | | % This </CAPTION> |
| </CAPTION> | | Nov. 15 | Nov. 14 | Year </CAPTION> |
| <TABLE> | U.S. | 248.1 | 247.5 | +8/1 <TABLE> |
| <TABLE> | Britain | 548.1 | 545.4 | +6.3 <TABLE> |
| <TABLE> | Canada | 350.7 | 349.4 | 0.0 <TABLE> |
| <TABLE> | Japan | 1350.8 | 1340.1 | +32.1 <TABLE> |
| <TABLE> | World index | 478.9 | 476.1 | 17.4 <TABLE> |

Differential Gap Structure Heuristic

The Differential Gap Structure Heuristic tags as caption data any lines at the beginning or end of a table having a gap alignment that does not match the average gap alignment for the rest of the lines in the extracted data table. Table 7 is an example of a table which benefits from use of this heuristic.

TABLE 7

The second line of this extracted table is tagged as caption data by the Differential Gap Structure Heuristic

| | | | | | | |
|---|---|---|---|---|---|---|
| <CAPTION> | | | | | | |
| <CAPTION> | NAME | (In billions) | SHARE | CARDS* | RATE | </CAPTION> |
| <TABLE> | Citicorp | $25.0 | 16.9% | V/MC | 19.80 | </TABLE> |
| <TABLE> | Chase Manhattan | 9.0 | 6.1 | V/MC | 19.80 | </TABLE> |
| <TABLE> | Sears | 8.5 | 5.8 | D | 19.80 | </TABLE> |
| <TABLE> | First Chicago | 6.6 | 4.5 | V/MC | 19.80 | </TABLE> |
| <TABLE> | BankAmerica | 6.0 | 4.1 | V/MC | 19.80 | </TABLE> |
| <TABLE> | MHC Financial | 5.3 | 3.6 | V/MC | 19.80 | </TABLE> |
| <TABLE> | American Express | 5.2 | 3.5 | 0 | 16.25 | </TABLE> |
| <TABLE> | Bank of New York | 3.8 | 2.6 | V/MC | 16.98 | </TABLE> |
| <TABLE> | Manufacturers Hanover | 2.9 | 2.0 | V/MC | 19.80 | </TABLE> |
| <TABLE> | Wells Fargo | 2.5 | 1.7 | V/MC | 19.80 | </TABLE> |
| <TABLE> | Total for top 10 | $74.8 | </TABLE> | | | |
| <CAPTION> | (or about 51% of industry vs. about 47% in 1987) | | | | | </CAPTION> |
| <CAPTION> | *V-Visa; MC = MasterCard; D = Discover; 0 = Optima | | | | | </CAPTION> |
| <CAPTION> | Sources: Individual issuers; RAM Research Bankcard | | | | | </CAPTION> |

TABLE 5-continued

An extracted data table with intermittent caption

| | | |
|---|---|---|
| <TABLE> | National Semiconductor | 5.4 <TABLE> |
| <TABLE> | Intel | 4.5 <TABLE> |
| <TABLE> | NEC | 3.9 <TABLE> |
| <TABLE> | ITT | 3.8 <TABLE> |
| <TABLE> | Advanced Micro Devices | 3.7 <TABLE> |
| <TABLE> | Plessey | 3.7 <TABLE> |
| <TABLE> | TOTAL MARKET: | $6.36 billion |
| </CAPTION> | Source: Dataquest Inc. | </CAPTION> |

Differential Column Count Heuristic

This heuristic exploits the fact that lines appearing at the beginning of an extracted table which have fewer columns than the average number of columns present in the table are potential caption data. For example, if each line in a table has 4 columns, a line at the beginning of the table having only 3 columns, is a potential caption and should be marked as caption data. An illustration of an extracted table on which this heuristic could be advantageously used is shown below in Table 6.

If a line immediately following a caption has a format that is different from that of the average table format, that line is subjected to further tests to determine if it should be tagged as caption data or tagged as a table entry. A first test to which the line may be subjected is determining if the line is mostly numerical or mostly textual. This may be done in any of a variety of ways, the simplest being to count the number of text characters versus the number of numeric characters appearing in each line. Lines having mostly numerical data should be tagged as table entries, while lines having mostly textual characters should be tagged as caption data.

If the first test is indeterminate, or as a second test to increase confidence, the lines may be examined to determine if the textual characters which are present are in upper-case or mixed case. Column headings, and therefore caption data, typically appear as upper case textual entries while table entries are typically lower case or mixed case textual entries.

In addition, other heuristics may be used, either as a primary method of determining whether a line is caption data or a table entry, as a secondary method to be used in conjunction with a primary method, or as a tie breaking method should two or more of the main heuristics listed above give contradictory results. For example, centered lines that display a gap alignment characteristic which is different from the average gap alignment characteristics for the remainder of the table may be tagged as caption data. Second, the length of a line may be compared to the average line length for the other lines of the extracted data table. If the line's length is very different from the average length for lines in the extracted data table, then that line may be tagged as caption data. Lines may be examined to determine if they include words like "Table" or "Figure." Lines which include such words may be tagged as caption data. For tables in which the first line of a multiline caption has been identified, each following line may be tagged as caption data until a period is encountered. If the period occurs in the middle of a line, continue tagging lines as caption data until the next blank line in the extracted table is encountered.

Although the component tagging heuristics have been described in a general order, the order and number of heuristics to apply to a table may vary depending on characteristics of the corpora from which the table has been extracted. For example, pattern regularity heuristics need not be applied at all for extracted tables which do not exhibit interspersed caption and tables. Further, even for tables which do exhibit such behavior, pattern regularity heuristics must be applied after another heuristic that tentatively tags caption and table lines.

Once a table has been extracted and tagged, it is field indexed to facilitate its inclusion in a structured database environment. Any field indexing program may be used to index the table on the basis of any one or more table components. For example, a suitable indexing product which may be used to create the index based on table components is the indexing module for InQuery, manufactured by Soverign Hill Software, Inc. of Dedham, Mass.

Once a table has been field indexed, a user may query it using any sort of information retrieval engine, such as a Boolean retrieval engine, a natural language retrieval engine, or a probabilistic retrieval engine. Table documents may be field indexed at least partially by caption and table fields, giving the user the flexibility to query based on those fields. This provides greater flexibility because occurrence of words in a caption versus their occurrence as a table entry generally carries a different import to the user.

For example, a query like "health insurance united states" could represent a variety of user requirements. It could mean that the user really wants to know about health insurance in general with some association to the United States or she could be wanting to know specifically about health insurance in the United States. In the former case "health insurance" should occur in the caption and get more weight whereas in the latter case the entire set of words in the query should get equal weight. Another example is a query like "Stock prices of oil companies". A table that has all the words in the caption field is likely to be more relevant than a table with "stock prices" in captions and "oil companies" as table entry or "oil companies" in captions and "stock prices" as table entry. A table with "stock" and "companies" in captions and "prices" and "oil" as table entries is highly likely to be irrelevant. Thus, weighting the query based on fields can give the user the flexibility and power to manipulate and express information retrieval needs more precisely.

EXPERIMENTS

The System

The table extraction process is subject to a precision versus recall trade-off. Precision (getting only the table lines with no extraneous information) may have to be sacrificed in order to improve recall (getting all table in the text along with some non-table lines) or vice versa. The preprocessing module 12, generally, and the table extractor 20 in particular, can be tuned by adjusting the parameters alluded to above, i.e., K and M. If the parameters are highly constrained, precision improves because spurious lines are not included, but recall drops because it is more difficult for the heuristics described above to properly separate table entries from caption data. A high precision version of the system and a high recall version of the system were used for the experiments described below.

As an example of the trade-off between precision and recall, the high precision version of the system excluded from Table 4 many lines, such as "Vanderbilt one-ounce eau de toilette spray" and "Fruit of the Loom men's underwear (three-pack)." The high recall version of the system, on the other hand, extracted all table entry lines along with one extraneous line "While 52% of consumers surveyed in March by Leo J. Shapiro & Associates said sears was the best place to-buy power tools, only 1% said it was the best place to buy a woman's dress blouse."

Tuning a system for higher recall may ultimately prove, for many corpora, to be more advantageous, since it is highly improbable that a query term will match a randomly extracted word in an extraneous line. Hence, even if higher recall brings in extraneous lines, it may not affect the retrieval of the relevant tables. In addition, using proper weighting functions should eliminate the significance of randomly extracted sentence words versus relevant words.

Results of Extraction and Tagging

The preprocessing module 12 described above was run for table extraction and component tagging on Wall Street Journal database spanning the years 1987–1992. Table 8 shows the statistics for this process. The final structured document database was built using the collated set of 6509 tables

TABLE 8

Table Extraction & Component Tagging Statistics

| Database | Size | Wall-Clock Time | Table db Size | Number of Tables |
|---|---|---|---|---|
| WSJ87 | 131 MB | 17 min | 3.7 MB | 1857 |
| WSJ88 | 109 MB | 15 min | 3.4 MB | 1701 |
| WSJ89 | 38 MB | 4 min | .3 MB | 222 |
| WSJ90 | 73 MB | 10 min | 2.4 MB | 930 |
| WSJ91 | 145 MB | 20 min | 4.3 MB | 1417 |
| WSJ92 | 34 MB | 5 min | 1.1 MB | 382 |
| TOTAL | 530 MB | 71 min | 15 MB | 6509 |

Tables 9 and 10 show the accuracy statistics for a set of 100 documents, each having 50 tables in them. The table extractor 20 did not exclude any table in its entirety. The errors were few and spread out. In the case of the component tagger 30, the errors were highly localized. The following two tables illustrate that most of the tables were correctly tagged for all their components.

TABLE 9

Accuracy results for the Table Extractor

| | | |
|---|---|---|
| Total number of lines in 100 docs | 6205 | — |
| Total number of table and caption lines | 1005 | — |
| Total number of lines extracted by table extractor | 1041 | — |
| Total number of table and caption lines missed | 18 | 1.8% |
| total number of extraneous lines extracted | 54 | 5.4% |

TABLE 10

Accuracy results for the Component Tagger

| | | |
|---|---|---|
| Actual number of captions | 265 | — |
| Number of captions mis-tagged as table lines | 25 | 9.4% |

TABLE 10-continued

Accuracy results for the Component Tagger

| Actual number of table lines | 740 | — |
| Number of table lines mis-tagged as captions | 55 | 7.4% |

Retrieval Results

The system and method of the present invention was evaluated using two types of queries—natural language query and structured query (with field retrieval on caption and table fields). Query Set I contained 25 natural language queries. The relevance judgment set for each query was obtained by looking at the top 100 tables retrieved for that query. Query Set II contained 25 structured queries derived by manually reformulating the natural language queries from Set I. Table 11 shows the precision statistics generated for each Query Set. The precision measure used to assess the performance of the Query Sets is defined as:

$$\text{Precision} = \frac{\text{Number Relevant tables retrieved}}{\text{Total tables retrieved}}$$

It can be seen from Table 11 that the structured queries perform significantly better than the natural language queries. The average precision values improved by 20.9%. More importantly, it can be seen that the structured queries do even better in the top 20 tables. This strongly indicates that they are very good for interactive querying where the users are usually interested in the top 15 to 20 documents.

TABLE 11

Precision Statistics
Precision (% change) - 25 queries

| Tables | Natural Language Query | Structured Query |
|---|---|---|
| 5 | 72.0 | 84.0 (+16.7) |
| 10 | 58.8 | 71.6 (+21.8) |
| 15 | 48.0 | 62.4 (+30.0) |
| 20 | 42.0 | 51.8 (+23.3) |
| 30 | 33.3 | 39.1 (+17.4) |
| 100 | 12.8 | 13.6 (+6.3) |
| 200 | 6.4 | 6.8 (+6.3) |
| 500 | 2.6 | 2.7 (+3.8) |
| 1000 | 1.3 | 1.4 (+7.7) |
| Average | 52.6 | 63.6 (+20.9) |

The following queries illustrate the additional searching power that structured retrieval of tabular data gives to the user. For example, the following natural language query:

Natural Language Query: Stock prices of oil companies can be reformulated as:

Reformulated Query:

| #wsum (6.0 | (2.0 #field (CAPTION oil)) |
| | (2.0 #field (CAPTION stock)) |
| | (2.0 #field (CAPTION company)) |
| | (2.0 #field (CAPTION prices))). |

The reformulated query should be interpreted as follows: (2.0 CAPTION oil) means that the occurrence of "oil" in the CAPTION field gets a weight of 2.0 on a scale of 6.0. When the queries were used to retrieve data from a database, the average precision value for the natural language query was 49.5% and for the structured query was 57.7%. The structured query performed 16.4% better than the natural language query. With the natural language query, many irrelevant tables related to oil matters other than stock prices and tables concerning stock prices of companies other than oil companies were retrieved. The structured query has the power to specify, that "oil" and "stocks" should get more weight if they occur in caption and that "company" and "price" are not as important.

As a second example, the following natural language query:

Natural Language Query: Export of computers was reformulated as:

Reformulated Query:

| #wsum (5.0 | (2.0 #field (CAPTION exports)) |
| | (2.0 #field (CAPTION computers)) |
| | (1.0 #field (TABLE computers)). |

The average precision value for the natural language query was 80.6% and for the structured query was 64.5%. The natural language query performed 20.1% better than the structured query. The natural language query performs better because the reformulated query gives more weight to computers. So anything related to computers such as computer parts, computer prices, and computer companies were all retrieved and there were a large number of computer related tables in the database.

This query illustrates an important caveat about the structured queries. Although structured queries allow a user to more precisely express their information requirements, they are susceptible to bad reformulations leading to poor retrieval results. Also note that a structured query, at the very least, can be made to perform the same as the natural language query by giving equal weight to all the words occurring in all the fields.

For example, the following structured query is the same as the natural language query from which it was derived:

| #wsum (4.0 | (1.0 #field (CAPTION exports)) |
| | (1.0 #field (CAPTION computers)) |
| | (1.0 #field (CAPTION computers)) |
| | (1.0 #field (CAPTION exports)). |

The empirical results demonstrate that heuristic method-based table extraction and component tagging can be performed effectively and efficiently and that such structural decomposition can facilitate better representation of user's information needs and hence more effective retrieval of tables.

Tagging and field indexing additional table components in addition to table and caption fields, such as column and row headings, may lead to more effective query formulation and retrieval. The weighting function could be modified in such a way that caption data is given the highest weighting, column and row headings get the next highest weight, and table entries get the least weighting. Other possibilities include slicing the table into columns and treating each column as a document. The column header and body content occurring together indicates more specificity and could be a source of multiple evidence for the corresponding table. For example, if the query is "china Exports Slippers" and we have a table with "China" and "slippers" occurring together in a column, this should get more weight than the case where "Romania" and "slippers" occur in one column and "China" occurs in another one. In this embodiment, co-occurrence in a column would indicates higher relevance and, therefore, a more desirable record to return as a result.

Having described certain embodiments of the invention, it will now become apparent to one of ordinary skill in the art that other embodiments incorporating the concepts of the invention may be used. Therefore, the invention should not be limited to certain embodiments, but rather should be limited only by the spirit and scope of the following claims.

What is claimed is:

1. A method for identifying tables and their component fields, the tables embedded in a text document, the method comprising the steps of:

(a) storing in a memory element a character alignment graph, the graph indicating the number of text characters appearing in a particular horizontal location for each of a predetermined number of contiguous lines of text in the text document;

(b) identifying one of the predetermined number of contiguous lines as belonging to a table when the indication of the number of text characters appearing in a particular horizontal location for that predetermined number of contiguous lines fall below a predetermined threshold;

(c) forming an extracted table from all of the identified predetermined numbers of contiguous lines; and (d) identifying one or more captions for the extracted table on the basis of structural patterns contained in the extracted table.

2. The method of claim 1 wherein step (d) further comprises identifying lines of the extracted table as table lines, and not caption lines, by examining an extracted table line for one or more large gaps present in the middle of the extracted table line.

3. The method of claim 1 wherein step (d) further comprises identifying two lines of the extracted table as table lines, and not caption lines, by comparing the alignment of the gap structure present in each line.

4. The method of claim 1 wherein step (d) further comprises identifying a caption for the extracted table on the basis of context regularity.

5. The method of claim 1 wherein step (d) further comprises identifying a caption for the extracted table by identifying an extracted table line having a different number of columns than the remainder of the extracted table lines.

6. The method of claim 1 wherein step (d) further comprises identifying a caption for the extracted table by identifying an extracted table line having a different gap structure than the remainder of the extracted table lines.

7. A method for facilitating data retrieval from tables embedded in a text document, the method comprising the steps of:

(a) storing in a memory element a character alignment graph, the graph indicating the number of text characters appearing in a particular horizontal location for each of a predetermined number of contiguous lines of text in the text document;

(b) identifying one of the predetermined number of contiguous lines as belonging to a table when the indication of the number of text characters appearing in a particular horizontal location for that predetermined number of contiguous lines fall below a predetermined threshold;

(c) forming an extracted table from all of the identified predetermined numbers of contiguous lines;

(d) identifying one or more components of the extracted table on the basis of structural patterns contained in the extracted table;

(e) indexing the extracted table on the basis of the component tags in order to allow database queries to be performed on the extracted table.

8. The method of claim 1 wherein step (d) further comprises the steps of:

(d-a) identifying lines of the extracted table as table lines, and not caption lines, by examining an extracted table line for one or more large gaps present in the middle of the extracted table line; and (d-b) identifying caption lines from the identified table lines by determining if an identified table line has a different gap structure than the remainder of the extracted table lines.

9. The method of claim 1 wherein step (d) further comprises the steps of:

(d-a) identifying lines of the extracted table as table lines, and not caption lines, by examining an extracted table line for one or more large gaps present in the middle of the extracted table line; and (d-b) identifying table lines from the identified caption lines by determining if an identified caption line is immediately preceded by an identified table line which is itself immediately preceded by a second identified caption line and the identified caption line is immediately followed by an identified table line which is itself immediately followed by a third identified caption line.

10. The method of claim 7 wherein step (d) further comprises identifying one or more column headings of the extracted table on the basis of structural patterns contained in the extracted table.

11. The method of claim 7 wherein step (d) further comprises identifying one or more row headings of the extracted table on the basis of structural patterns contained in the extracted table.

12. The method of claim 7 wherein step (d) further comprises identifying one or more table lines of the extracted table on the basis of structural patterns contained in the extracted table.

13. The method of claim 7 wherein step (d) further comprises identifying one or more caption lines of the extracted table on the basis of structural patterns contained in the extracted table.

14. A system for performing data queries on tables embedded in text documents, the system comprising:

a table extractor which retrieves a text document from a memory element and processes the text document to identify at least one table embedded in the text document;

a component tagger which separates lines of the table identified by said table extractor into caption lines and table lines; and an indexing unit which indexes the tagged table so that a data query may be applied to the table.

15. A method for facilitating data retrieval from tables embedded in a text document, the method comprising the steps of:

(a) identifying one or more components of the table on the basis of structural patterns contained in the table;

(b) indexing the table on the basis of the component tags in order to allow database queries to be performed on the table.

16. The method of claim 15 wherein step (a) further comprises identifying one or more column headings of the table on the basis of structural patterns contained in the table.

17. The method of claim 15 wherein step (a) further comprises identifying one or more row headings of the table on the basis of structural patterns contained in the table.

18. The method of claim 15 wherein step (a) further comprises identifying one or more table lines of the table on the basis of structural patterns contained in the table.

19. The method of claim 15 wherein step (a) further comprises identifying one or more caption lines of the table on the basis of structural patterns contained in the table.

20. The method of claim 15 wherein step (a) further comprises the steps of:

(a-a) identifying lines of the table as table lines, and not caption lines, by examining an table line for one or more large gaps present in the middle of the table line; and (a-b) identifying caption lines from the identified table lines by determining if an identified table line has a different gap structure than the remainder of the table lines.

* * * * *